(12) United States Patent
Mohamed et al.

(10) Patent No.: US 10,817,552 B2
(45) Date of Patent: Oct. 27, 2020

(54) INPUT-OUTPUT EXAMPLE ENCODING

(71) Applicant: Microsoft Technology Licensing, LLC, Redmond, WA (US)

(72) Inventors: Abdelrahman S. A. Mohamed, Redmond, WA (US); Pushmeet Kohli, Bellevue, WA (US); Rishabh Singh, Kirkland, WA (US); Emilio Parisotto, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 775 days.

(21) Appl. No.: 15/470,751

(22) Filed: Mar. 27, 2017

(65) Prior Publication Data

US 2018/0276535 A1 Sep. 27, 2018

(51) Int. Cl.
*G06F 16/33* (2019.01)
*G06N 3/08* (2006.01)
(Continued)

(52) U.S. Cl.
CPC .......... *G06F 16/3344* (2019.01); *G06F 40/30* (2020.01); *G06N 3/0445* (2013.01);
(Continued)

(58) Field of Classification Search
CPC ..... G06F 16/3344; G06F 40/30; G06N 20/00; G06N 3/0445; G06N 3/0454; G06N 3/0472; G06N 3/08; G06N 5/003; G06N 5/046
See application file for complete search history.

(56) References Cited

U.S. PATENT DOCUMENTS 6,654,950 B1 11/2003 Barnishan
7,861,221 B2 12/2010 Fleischmann et al.
(Continued)

FOREIGN PATENT DOCUMENTS

| EP | 0401975 A2 | 12/1990 |
|---|---|---|
| EP | 0688448 B1 | 10/1997 |
| JP | 07319681 A | 12/1995 |

OTHER PUBLICATIONS

Parisotto et al., "Neuro-Symbolic Program Synthesis", Nov. 6, 2016, ICLR 2017, pp. 1-14 (Year: 2016).*
(Continued)

*Primary Examiner* — Robert A Cassity
*Assistant Examiner* — Brent Johnston Hoover
(74) *Attorney, Agent, or Firm* — Schwegman Lundberg & Woessner, P.A.

(57) ABSTRACT

Generally discussed herein are devices, systems, and methods for encoding input-output examples. A method of generating a program using an encoding of input-output examples, may include processing an input example of the input-output examples, using a first long short term memory (LSTM) neural network, one character at a time to produce an input feature vector, processing an output example associated with the input example in the input-output examples, using the LSTM neural network, one character at a time to produce an output feature vector, determining (a) a cross-correlation between the input feature vector and the output feature vector or (b) previously computed feature vectors for a different input-output example that are sufficiently close to the input feature vector and the output feature vector, respectively, and using the determined cross-correlation or previously computed vector, generating a program consistent with the input example and the output example.

20 Claims, 9 Drawing Sheets

(51) Int. Cl.
  G06N 3/04       (2006.01)
  G06N 20/00      (2019.01)
  G06N 5/00       (2006.01)
  G06F 40/30      (2020.01)
  G06N 5/04       (2006.01)

(52) U.S. Cl.
  CPC ......... *G06N 3/0454* (2013.01); *G06N 3/0472* (2013.01); *G06N 3/08* (2013.01); *G06N 5/003* (2013.01); *G06N 20/00* (2019.01); *G06N 5/046* (2013.01)

(56) References Cited

U.S. PATENT DOCUMENTS

| | | |
|---|---|---|
| 8,510,246 B2 | 8/2013 | Cox |
| 9,182,980 B2 | 11/2015 | Campbell et al. |
| 2007/0169036 A1 | 7/2007 | Garner et al. |
| 2007/0208492 A1 | 9/2007 | Downs et al. |
| 2011/0302553 A1 | 12/2011 | Gulwani |
| 2013/0346982 A1 | 12/2013 | Kalai et al. |
| 2015/0356401 A1 | 12/2015 | Vinyals et al. |
| 2016/0019587 A1 | 1/2016 | Hueter et al. |
| 2016/0099010 A1 | 4/2016 | Sainath et al. |
| 2017/0192956 A1 | 7/2017 | Kaiser et al. |
| 2018/0197089 A1 | 7/2018 | Krasser et al. |
| 2018/0275967 A1 | 9/2018 | Mohamed et al. |

OTHER PUBLICATIONS

"Non Final Office Action Issued in U.S. Appl. No. 15/470,784", dated Aug. 27, 2018, 13 Pages.

Balog, et al., "Deepcoder: Learning to Write Programs", In Journal of Computing Research Repository, Nov. 2016, pp. 1-21.

Costa, et al., "Learning Incremental Syntactic Structures with Recursive Neural Networks", In Proceedings of Fourth International Conference on Knowledge-Based Intelligent Engineering Systems and Allied Technologies, vol. 2, Sep. 30, 2000, 4 pages.

Devlin, et al., "RobustFill: Neural Program Learning under Noisy I/O", arXiv preprint arXiv:1703.07469, Mar. 21, 2017, 18 Pages.

Mou, et al., "Building Program Vector Representations for Deep Learning", In Proceedings of 8th International Conference on Knowledge Science, Engineering and Management, Oct. 28, 2015, 11 pages.

Mou, et al., "On End-to-End Program Generation from User Intention by Deep Neural Networks", In Journal of Computing Research Repository, Oct. 2015, 4 pages.

Richards, et al., "Auto-coding implementation of Model Predictive Control with application to flight control", In Proceedings of European Control Conference, Aug. 23, 2009, pp. 150-155.

"Final Office Action Issued in U.S. Appl. No. 15/470,784", dated Feb. 25, 2019, 12 Pages.

"Final Office Action Issued in U.S. Appl. No. 15/470,784", dated Oct. 3, 2019, 13 Pages.

"Non Final Office Action Issued in U.S. Appl. No. 15/470,784", dated May 31, 2019, 14 Pages.

Singh, et al., "Predicting a Correct Program in Programming by Example", In International Conference on Computer Aided Verification, Jul. 18, 2015, pp. 1-17.

Gulwani, Sumit, "Programming by Examples", In Dependable Software Systems Engineering, Apr. 19, 2016, 22 pages.

Manshadi, et al., "Integrating Programming by Example and Natural Language Programming", In Proceedings of the twenty-seventh AAAI Conference on Artificial Intelligence, Jun. 30, 2013, 7 pages.

Jeon, et al., "JSketch: sketching for Java", In Proceedings of the 2015 10th Joint Meeting on Foundations of Software Engineering, Aug. 30, 2015, pp. 934-937.

Esmaeilzadeh, et al., "Neural Acceleration for General-Purpose Approximate Programs", In Proceedings of IEEE/ACM 45th Annual International Symposium on Microarchitecture, Dec. 1, 2012, pp. 449-460.

Faunes, et al., "Generating model transformation rules from examples using an evolutionary algorithm", In Proceedings of the 27th IEEE/ACM International Conference on Automated Software Engineering, Sep. 3, 2012, pp. 250-253.

Lee, et al., "Synthesizing regular expressions from examples for introductory automata assignments", In Proceedings of the ACM SIGPLAN International Conference on Generative Programming: Concepts and Experiences, Oct. 31, 2016, pp. 70-80.

Udupa, et al., "Transit: specifying protocols with concolic snippets", In Proceedings of the 34th ACM SIGPLAN Conference on Programming Language Design and Implementation, Jun. 16, 2013, pp. 287-296.

Alur, et al., "Syntax-Guided Synthesis", In Proceedings of Dependable Software Systems Engineering, May 2015, 8 pages.

Bielik, et al., "PHOG: Probabilistic Model for Code", In Proceedings of the 33rd International Conference on Machine, Jun. 19, 2016, 10 pages.

Biermann, Alan W., "The Inference of Regular LISP Programs from Examples", In Journal of IEEE Transactions on Systems, Man, and Cybernetics, vol. 8, Issue 8, Aug. 1978, pp. 585-600.

Bunel, et al., "Adaptive Neural Compilation", In Journal of Computing Research Repository, May 2016, pp. 1-25.

Gaunt, et al., "TerpreT: A Probabilistic Programming Language for Program Induction", In Journal of Computing Research Repository, Aug. 2016, pp. 1-50.

Graves, et al., "Neural Turing Machines", In Journal of Computing Research Repository, Oct. 2014, pp. 1-26.

Gulwani, Sumit, "Automating String Processing in Spreadsheets Using Input-Output Examples", In Proceedings 38th Annual ACM SIGPLAN-SIGACT Symposium on Principles of Programming Languages, Jan. 26, 2011, pp. 317-329.

Gulwani, et al., "Synthesis of Loop-free Programs", In Proceedings of 32nd ACM SIGPLAN Conference on Programming Language Design and Implementation, Jun. 4, 2011, pp. 62-73.

Gulwani, et al., "Spreadsheet Data Manipulation using Examples", In Journal of Communications of the ACM, vol. 55, No. 8, Aug. 2012, pp. 97-105.

Hindle, et al., "On the Naturalness of Software", In Journal of Communications of the ACM, vol. 59, No. 5, May 2016, pp. 122-131.

Irsoy, et al., "Bidirectional Recursive Neural Networks for Token-Level Labeling with Structure", In Proceedings of Neural Information Processing Systems Deep Learning Workshop, Dec. 9, 2013, pp. 1-9.

Joulin, et al., "Inferring Algorithmic Patterns with Stack-Augmented Recurrent Nets", In Proceedings of Annual Conference on Neural Information Processing Systems, Dec. 7, 2015, pp. 1-9.

Kurach, et al., "Neural Random-Access Machines", In Journal of Computing Research Repository, Nov. 2015, pp. 1-17.

Le, et al., "The Inside-Outside Recursive Neural Network Model for Dependency Parsing", In Proceedings of Conference on Empirical Methods on Natural Language Processing, Oct. 25, 2014, pp. 729-739.

Liang, et al, "Learning Programs: A Hierarchical Bayesian Approach", In Proceedings of the 27th International Conference on Machine Learning, Jun. 21, 2010, 8 pages.

Menon, et al., "A Machine Learning Framework for Programming by Example", In Proceedings of the 30th International Conference on Machine Learning, Jun. 1, 2013, 9 pages.

Neelakantan, et al., "Neural Programmer: Inducing Latent Programs with Gradient Descent", In Journal of Computing Research Repository, Nov. 2015, pp. 1-18.

Paulus, et al., "Global Belief Recursive Neural Networks", In Journal of Advances in Neural Information Processing Systems, Dec. 8, 2014, pp. 1-9.

Raychev, et al., "Predicting Program Properties from Big Code", In Proceedings of the 42nd Annual ACM SIGPLAN-SIGACT Symposium on Principles of Programming Languages, Jan. 15, 2015, pp. 111-124.

Reed, et al., "Neural programmer-interpreters", In Journal of Computing Research Repository, Nov. 2015, pp. 1-13.

Riedel, et al., "Programming with a differentiable forth interpreter", In Journal of Computing Research Repository, May 2016, pp. 1-14.

(56) References Cited

OTHER PUBLICATIONS

Schkufza, et al., "Stochastic superoptimization", In Proceedings of the eighteenth international conference on Architectural support for programming languages and operating systems, Mar. 16, 2013, pp. 305-315.
Singh, et al., "Synthesizing data structure manipulations from storyboards", In Proceedings of the 19th ACM SIGSOFT symposium and the 13th European conference on Foundations of software engineering, Sep. 5, 2011, 11 pages.
Singh, et al., "Automated feedback generation for introductory programming assignments", In Proceedings of the 34th ACM SIGPLAN Conference on Programming Language Design and Implementation, Jun. 16, 2013, pp. 15-26.
Solar-Lezama, Armando, "Program Synthesis by Sketching", In Thesis of University of California, Dec. 21, 2016, 214 pages.
Solar-Lezama, et al., "Programming by sketching for bit-streaming programs", In Proceedings of the ACM SIGPLAN conference on Programming language design and implementation, Jun. 12, 2005, pp. 281-294.
Summers, Phillip D, "A methodology for lisp program construction from examples", In Journal of the ACM, vol. 24, Issue 1, Jan. 1977, pp. 161-175.
Maddison, et al, "Structured generative models of natural source code", In Proceedings of the 31st International Conference on Machine, Jun. 26, 2014, 9 pages.
"Non Final Office Action Issued in U.S. Appl. No. 15/470,784", dated Feb. 28, 2020, 17 Pages.

\* cited by examiner

INPUT-OUTPUT EXAMPLE ENCODING

BACKGROUND

A number of neural network architectures have been proposed for program induction. Given a set of input-output examples, these architectures may be able to learn mappings that generalize new test inputs, such that a desired output may be predicted based on the new test input(s). These architectures have some limitations such as being computationally expensive, being hard to train, a model may need to be trained for each task separately, and/or it may be difficult to interpret or verify the correctness of a learned mapping.

The desire for better interpretability and scalability of neural network models has motivated research into program synthesis, that is, the automatic construction of interpretable programs in a given domain-specific language (DSL) that are consistent with a given specification (taking the form of, e.g., partial programs, input-output examples, or natural language). Various approaches have been developed to search over the space of possible programs in the DSL; these approaches include, for example, stochastic, constraint-based, and version-space-algebra-based algorithms. Many of these techniques not only take significant engineering and research efforts to develop carefully-designed heuristics for efficient search, but are limited in their range of applicability and the sizes and types of programs they can synthesize.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed this summary section is not intended to provide limitation to the elements of the claimed subject matter.

A method of generating a program using an encoding of input-output examples includes processing an input example of the input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

A non-transitory machine-readable medium including instructions for execution by a processor of the machine to perform operations including processing an input example of input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

A device includes a processor and a memory device coupled to the processor and having a program stored thereon for execution by the processor to perform operations. The operations include processing an input example of input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

DETAILED DESCRIPTION

Figure 1:
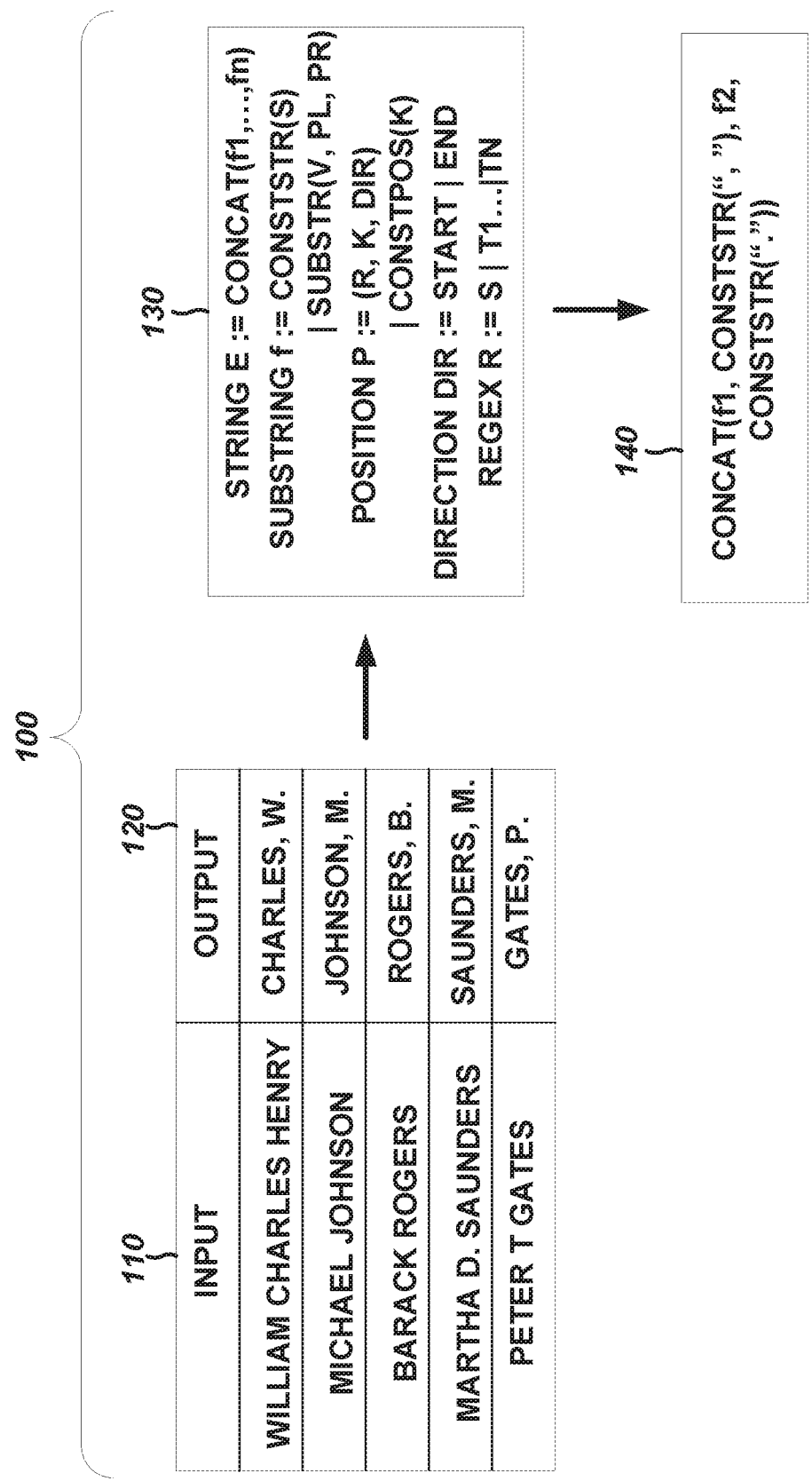
FIG. 1 illustrates, by way of example, a flow diagram of an embodiment of a technique of generating a program based on input-output examples.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine readable media or storage device, such as one or more non-transitory memories or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, or the like).

Discussed herein are embodiments that may include automatically constructing computer programs (e.g., compileable and/or executable programs), detecting anomalies in input-output examples, and/or classification of input-output examples. In one or more embodiments, after one or more neural networks are properly trained, a computer program constrained by a domain-specific language (DSL) may produce output consistent with the input-output examples.

In one or more embodiments, input-output examples may be encoded. Then, the encoded input-output examples may be analyzed to determine if an input-output example does not belong in the set. Such an analysis may include determining a distance between encoded input-output examples, such as between an individual encoded input-output example and all other encoded input-output examples in a set of encoded input-output examples. The determined distances for the individual input-output example may be summed, averaged, or the like to determine a total distance. The total distance may be compared to a threshold. The input-output example may be determined to be anomalous if the total distance is greater than (or equal to) the threshold.

Like input-output examples may be classified using a similar distance to threshold comparison. If the total distance is less than (or equal to) a threshold, the input-output example may be determined to be a part of the corresponding set of input-output examples.

Embodiments may include implementations of one or more of multiple neural networks. A first neural network, referred to sometimes as a cross-correlation input-output network may produce a representation of a set of input-output examples, given the set of input-output examples. Another neural network, sometimes referred to as a recursive-reverse-recursive neural network (R3NN), may produce a program, given the representation of the input-output examples. The program may be generated by incrementally expanding partial programs. The effectiveness of this encoding and program production approach may be tested by applying it to regular expression based string transformations. The results of the testing seem to support that R3NN is able to construct a program from new input-output examples. The results of the testing also seem to support that the R3NN is able to construct new programs for tasks that it had never observed during training.

While the discussion that follows focuses on program generation, other applications, such as input-output example anomaly detection and/or input-output example classification, as previously discussed, may be possible based on the encoding.

The act of programming. (e.g., developing a procedure to accomplish a task) is a demonstration of the reasoning abilities of the human mind. Program induction is considered one of the fundamental problems in machine learning and/or artificial intelligence. Recent progress on deep learning has led to the proposal of a number of promising neural network architectures for program induction. Many of these models are inspired by computation subsystems (CPU, random access memory (RAM), GPU) or common data structures used in some techniques (e.g., a memory stack). A common thread in program induction is to specify the atomic operations of the network in some differentiable form, allowing efficient end-to-end training of a neural controller, and/or to use reinforcement learning to make choices about which operation to perform. While these results are impressive, these approaches have some limitations. The limitations may include one or more of: (a) they are computationally expensive and hard to train, (b) a model has to be trained for each task (program) separately, and (c) it is hard to interpret or verify the correctness of the learned mapping (as it is defined by a neural network). While some recently proposed methods are able to learn interpretable programs, such methods still need to learn a separate neural network model for each individual task.

At least partially motivated by the need for model interpretability and scalability to multiple tasks, embodiments discussed herein may address a problem of program synthesis. Program synthesis, the problem of automatically constructing programs that are consistent with a given specification, has long been a subject of research in computer science. This interest has been reinvigorated in recent years behind development of methods for learning programs in various domains ranging from low-level bit manipulation code to data structure manipulations and regular expression based string transformations.

Some of the recently proposed approaches for program synthesis operate by searching the space of programs in a DSL instead of arbitrary Turing-complete languages. This hypothesis space of possible programs is huge (potentially infinite) and searching over it is a challenging problem. Several search approaches including enumerative, stochastic, constraint-based, and version-space algebra based algorithms have been developed to search over the space of programs in the DSL, which support different kinds of specifications (examples, partial programs, natural language, or the like) and domains. These approaches not only require significant engineering and research effort to develop carefully-designed heuristics for efficient search, but also have limited applicability and can only synthesize programs of limited sizes and types.

Embodiments herein include techniques, sometimes called neuro-symbolic program synthesis (NSPS) that learns and/or is trained to generate a program incrementally without the need for an explicit search. Once trained, NSPS may (e.g., automatically) construct a computer program that is consistent with a set (e.g., any set) of input-output examples provided at test, run, and/or training time. Embodiments may include two neural architectures. The first neural architecture, sometimes called the cross correlation input/output (I/O) network, produces an encoded representation of a given set of input-output examples. The second neural architecture, the (R3NN), given the encoded representation of the input-output examples, synthesizes a program (e.g., an executable or compilable program) by incrementally expanding partial programs. R3NN, in one or more embodiments, employs a tree-based neural architecture that sequentially constructs a parse tree by selecting which non-terminal symbol to expand using rules from a context-free grammar (e.g., the DSL). This generative process over trees may be conditioned on an encoding of input-output example pairs that provide the specification of the program for which the neural network is searching. A goal may include, provided some input values, the program found by the model reproduces the provided output values when run based on the input values.

The efficacy of one or more embodiments, as previously discussed, may be tested by applying one or more approaches to the rich and complex domain of regular expression-based syntactic string transformations. The DSL used may be based on the one used by Flash-Fill, a Programming-By-Example (PBE) system in Microsoft® Excel, from Microsoft Corporation of Redmond, Wash., United States. Given multiple input-output examples of strings, the task is to synthesize a program built on regular expressions to perform the desired string transformation indicated by the given input-output examples.

FIG. 1 illustrates, by way of example, a flow diagram of an embodiment of a technique 100 of generating a program based on input-output examples. An example task that can be expressed in a DSL is shown in FIG. 1, which also shows the DSL. The technique 100 as illustrated includes input examples 110, output examples 120, a DSL 130, and a program 140 generated based on the input examples 110 and output examples 120. Each of the output examples 120 includes a corresponding input example 110. For example, "Charles, W." is the desired output in response to input of "William Charles Henry".

An evaluation methodology previously discussed seems to indicate that embodiments of the NSPS discussed herein are able to construct programs for known tasks from new input-output examples and to to construct completely new programs that it had not observed during training. Some features of the embodiments discussed herein may include: a novel NSPS technique to encode neural search over a space of programs defined using a DSL, an R3NN model that encodes and expands partial programs in the DSL, where each node may include a global representation of the program tree, a novel cross-correlation based neural architecture for learning a representation (e.g., a continuous representation) of sets of input-output examples, and/or evaluation of the NSPS approach on the complex domain of regular expression based string transformations.

First, an overview of an approach that includes a formal definition of the DSL-based program synthesis problem that may be solved by one or more embodiments. Given a DSL L, automatically construct a synthesis algorithm A, such that, given a set of input-output examples, $\{(i1, o1), \ldots, (in, on)\}$, A returns a program $P \in L$ that conforms to the input-output examples, as in Equation 1:

$$1 \leq j \leq n \ P(ij) = oj \qquad \text{Equation 1}$$

An example of syntax and semantics of a DSL for string transformation is shown in FIG. 1 (the program 140). The DSL 130 corresponds to a large subset of a FlashFill DSL (except conditionals), and allows for a richer class of substring operations than FlashFill. A DSL program takes as input a string, v, and returns an output string, o. The top-level string expression e is a concatenation of a finite list of substring expressions f1, ... fn. A substring expression f can either be a constant string s or a substring expression, which is defined using two position logics pl (left) and pr (right). A position logic corresponds to a symbolic expression that evaluates to an index in the string. A position logic p can either be a constant position k or a token match expression (r k, Dir), which denotes the start or end of the kth match of token r in input string v. A regex token can either be a constant string s or one of 8 regular expression tokens: p (ProperCase), C (CAPS), l (lowercase), d (Digits), a (Alphabets), an (Alphanumeric), $\wedge$ (StartOfString), and \$ (EndOfString). This is but one example of a string expression DSL. DSLs for other types of programs, such as numeric manipulation (e.g., to perform mathematical operations) and/or string or other symbol manipulation may be used in place of the DSL.

A DSL program for the name transformation task shown in FIG. 1 that is consistent with the examples 110 and 120 is provided as the program 140. The program 140 concatenates the following 4 strings: i) substring between the end of last whitespace and end of string, ii) constant string ",", iii) first character of input string, and iv) constant string ".".

A DSL can be considered a context-free grammar with terminal and non-terminal symbols S and production rules R that allow representing programs and partial programs as tree structures (see, e.g., FIGS. 3A and 3B for example partial program trees). A partial program tree has two types of nodes (apart from the root node): leaf nodes and inner non-leaf nodes. A leaf node represents a symbol in the DSL, whether non-terminal or terminal. An inner non-leaf node represents a particular production rule of the DSL, and the number of children of the non-leaf node is equivalent to the arity of the right hand side of the rule it represents. A partial program tree can be iteratively expanded by applying production rules (e→e op2 e) to the non-terminal leaf nodes. Accordingly, a partial program tree represents a program obtained after a number of steps into construction. Program construction is complete once all leaves of the tree represent terminal symbols (such that the tree cannot be further expanded with production rules); such a complete tree is herein referred to simply as the "program tree," and represents a completed program under the DSL that is ready for execution.

A naive way to perform a search over the programs in a given DSL is to begin with the start symbol of the DSL as root node, and then iteratively expand the partial tree by randomly choosing non-terminal leaf nodes (also simply "non-terminals") to expand with randomly chosen production rules until a derivation with only terminal leaf nodes (also simply "terminals"), corresponding to a complete program tree, is reached. In accordance with various embodiments, by contrast, the program space is searched more efficiently with a generative model (herein also "program-generation model") that assigns probabilities to different non-terminals in a partial derivation and corresponding expansions to guide the search for complete derivations. The generative model is implemented with a neural network, and is conditioned on input-output examples encoded themselves by a neural network. The generative model and the input-output encoder, which collectively constitute the synthesis algorithm A, may be trained end-to-end on a training set of programs in the DSL together with their corresponding input-output examples.

Encoding input-output examples is presented and followed by a discussion of program generation using the input-output encoding.

The encoded input-output examples may provide an at least partial specification for the output program. An encoding of the input-output examples may aid the success of the program generator (discussed elsewhere). The encoding may be domain-specific, since different DSLs have different inputs (some may operate over integers, real numbers, strings, and/or a combination thereof). An encoding may be adapted to the input-output symbol strings of the example symbol strings, such as shown in FIG. 1. Different ways of conditioning program search on the learned input-output example encodings are also provided.

In the example of a string manipulation program (e.g., that shown in FIG. 1), there are at least two types of information that may be extracted from input-output examples: 1) constant strings, (e.g., "@domain.com", ".", or any other constant string) which appear in all output examples; and 2) substring indices in input where the index might be further defined by a regular expression. These indices determine which parts of the input are also present in the output. In earlier "hand-engineered" systems, such as FlashFill, this information was extracted from the input-output examples by performing a longest common substring technique, a dynamic programming technique that finds matching substrings in string pairs. To extract constant strings, FlashFill runs LCS on every output string in the I/O set to get a set of constant string candidates. Then FlashFill takes the intersection of the constant string candidates produced by every output string pair, giving the set of constant strings that are consistent for the entire I/O set. A similar procedure is done for extracting substring indices, except that LCS is run on input-output string pairs rather than just output strings. A difficulty with this approach may include finding substring indices where those indices are specified by regular expressions (regex), since LCS only operates over characters and not regex tokens. Therefore, FlashFill simply tries every possible regex that can be used at substring boundaries and exhaustively searches for one which is the most "general", where generality is generally specified by hand-engineered heuristics.

An encoding may extract a sort of generalized LCS that operates not only over the specific characters of the input string but also regular expression tokens that match parts of the input string. Instead of hand-designing a complicated technique to do this, a neural network based architecture may be trained to extract and produce representations of the likely regular expressions given input-output examples.

Figure 2:
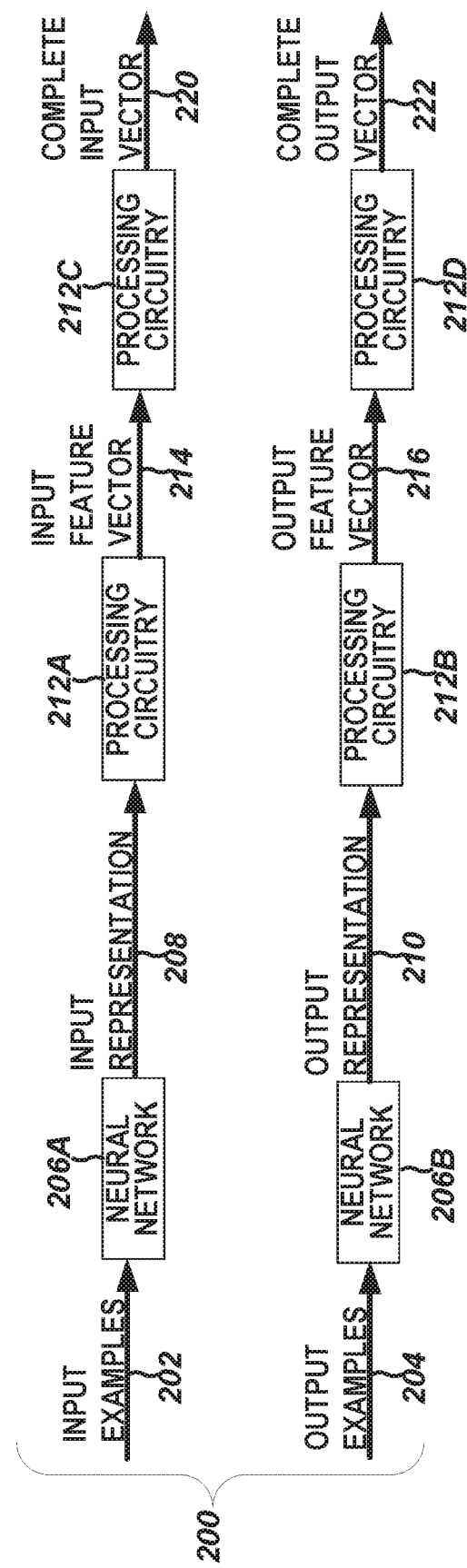
FIG. 2 illustrates, by way of example, a block diagram of a portion of an encoding system.

FIG. 2 illustrates, by way of example, a block diagram of a portion of an encoding system 200. The system 200 as illustrated includes input example 202, output examples 204, neural networks 206A and 206B, input representation 208, output representation 210, processing circuitry 212A, 212B, 212C, and 212D, input feature vector 214, output feature vector 216, complete input feature vector 220, and complete output feature vector 222.

A first level of input-example encoding may include encoding using the neural network 206A-B. In one or more embodiments, the neural networks 206A-B may include long-short term memory (LSTM) neural networks. The input to the neural network 206A is the input examples 202. The input to the neural network 206B is the output examples 204. The input examples 202 may include the input 110, and the output examples 204 may include the output 120. The system 200 may run two, separate deep bidirectional long-short term memory (LSTM) neural networks (e.g., 206A-B).

A topmost hidden representation at every time step (e.g., the input representation 208 and the output representation 210) may be concatenated (or otherwise processed, such as by the processing circuitry 212A-B) to produce a feature vector (e.g., the input feature vector 214 and the output feature vector 216). In the example of concatenating, the input feature vector 214 and the output feature vector 216 may be 4HT-dimensional per I/O pair, where T is the maximum string length for any input or output, and H is the topmost neural network hidden dimension.

Each of the input feature vectors 214 and output feature vectors 216 may be concatenated (or otherwise processed, such as by the processing circuitry 218A-B), respectively, to produce the complete input feature vector 220 and the complete output feature vector 222, respectively. The complete input feature vector 220 and complete output feature vector 222 may provide an encoded vector representation of each of the input examples 110 and the output examples 120 in the input-output example set. This encoded representation may have little or no knowledge about what operations are being performed over the input examples 110 to produce the output examples 120 (e.g., substring, constant, mathematical operation, regular expression, etc.), which might make it difficult to discover substring indices, especially the ones based on regular expressions.

Each of the input examples 202 may be processed one character at a time by the neural network 206A. Each of the input examples 202 may include a first character and a last character. For examples, the input example "Barack Rogers" includes a first character "B" and a last character "s". The case of the character may or may not be important, depending on the output desired. In the example provided in FIG. 1, case is important. The neural network 206A may process the input example 202 one character at a time in a "forward pass" and/or one character at a time in a "backward pass". In the forward pass, the neural network 206A processes the input example 202 one character at a time, from the first character to the last character. In the backward pass, the neural network 206B processes the input example 202 one character at a time, from the last character to the first character. In the example of the input example 202 being "Barack Rogers", the neural network 206A processes the "B", "a", "r", "a", "c" . . . "e", "r", and "s" in that order to produce a forward input feature vector and in the backward pass, the neural network 206A processes the "s", "r", "e" "g", "o" . . . "r", "a", and "B" in that order to produce a backward input feature vector. The input feature vector 214 may include the forward input feature vector, the backward input feature vector, and/or a combination (e.g., concatenation or other combination, such as an addition or average) of the forward input feature vector and the backward input feature vector.

Each of the output examples 204 may be processed, in a manner similar to the input examples 202, one character at a time by the neural network 206B. Each of the output examples 204 may include a first output character and a last output character. For example, the output example "Rogers, B." includes a first character "R" and a last character ".". The case of the character may or may not be important. The neural network 206B may process the output example 204 one character at a time in a "forward pass" and one character at a time in a "backward pass". In the forward pass, the neural network 206B processes the output example 204 one character at a time, from the first character to the last character. In the backward pass, the neural network 206B processes the output example 204 one character at a time, from the last character to the first character. In the example of the output example 204 being "Rogers, B.", the neural network 206B processes the "R", "o", "g", "e", "r" . . . " ", "B", and "." in that order to produce a forward output feature vector and in the backward pass, the neural network 206B processes the ".", "B", " ", ",", "s" . . . "g", "o", and "R" in that order to produce a backward output feature vector. The output feature vector 216 may include the forward output feature vector, the backward output feature vector, and/or a combination (e.g., concatenation or other combination, such as an addition or average) of the forward output feature vector and the backward output feature vector. Concatenation results, for a maximum string length of T (which corresponds to T time steps in the LSTM encoding) and a topmost LSTM hidden dimension H, in a 2HT-dimensional input representation for each input string and a 2HT-dimensional output representation for each output string.

An LSTM network is a type of neural network that contains LSTM units. An LSTM unit includes no activation function within its recurring units. The LSTM unit generally includes one or more gates that control a flow of data into/out of the unit. The gates may include an input gate, forget gate, and/or output gate. An input gate controls whether a new value flows into the unit. A forget gate controls whether a value remains in the unit. An output gate controls whether a value is used to compute an output of the unit.

Concatenation is linking things (e.g., numbers, strings, symbols, characters, or the like) together in a chain or series. For example, a concatenation of the string "William" and the string "Charles" may include "WilliamCharles" or "CharlesWilliam".

Figure 3:
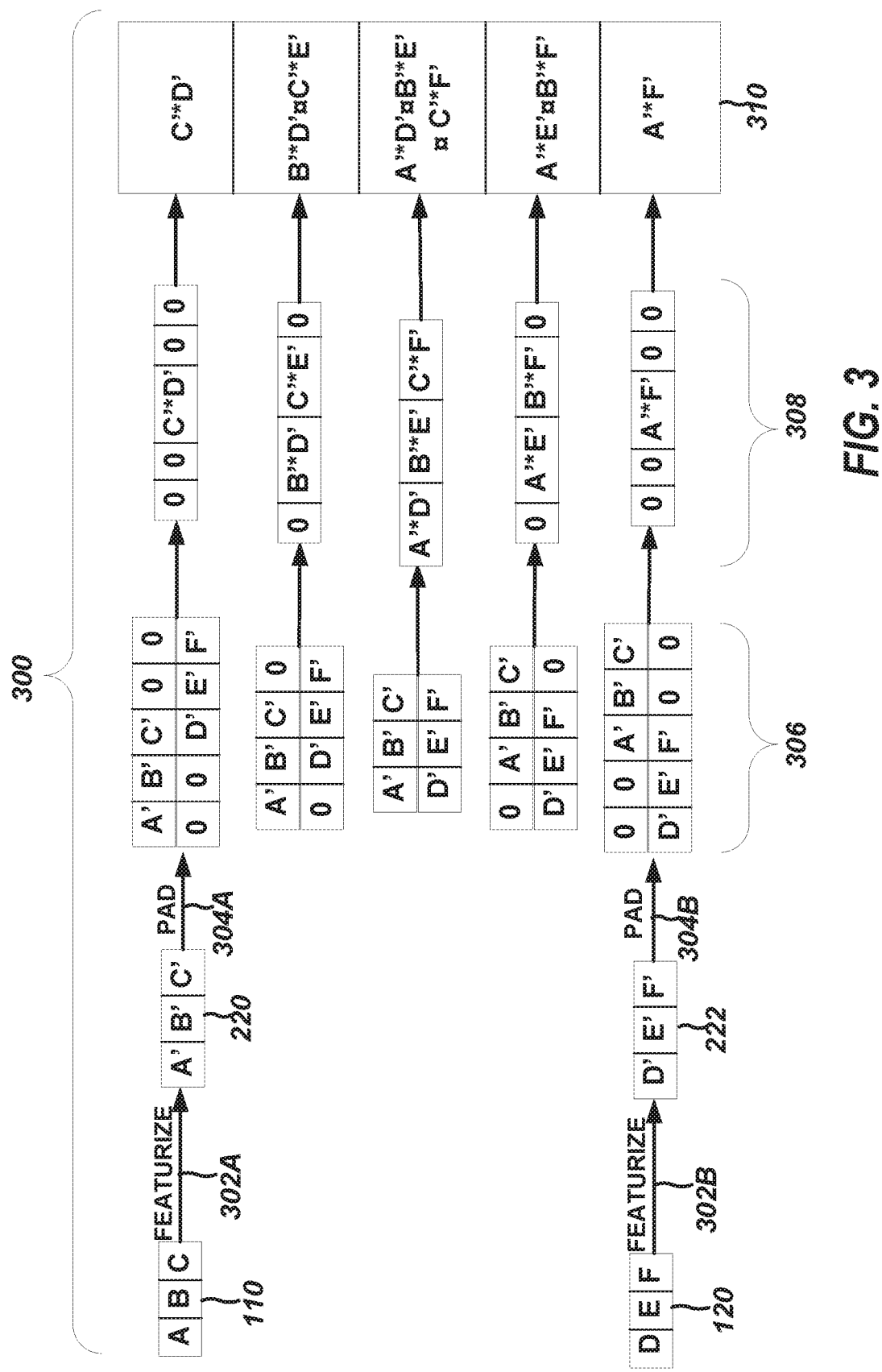
FIG. 3 illustrates, by way of example, a flow diagram of an embodiment of a system for determining a cross-correlation of input-output examples.

FIG. 3 illustrates, by way of example, a flow diagram of an embodiment of a system 300 for determining a cross-correlation of input-output examples. The system 300 as illustrated includes an input example 110, an output example 120, a complete input feature vector 220, a complete output feature vector 222, and an encoded vector 310.

The determined cross-correlation between input example and output example may be an encoding of the input-output examples. The cross-correlation may help discover input example substrings that are copied to the output. The cross-correlation may be computed between each input example and output example pair.

The input example 110 is featurized (indicated by arrow 302A) to generate the complete input feature vector 220. Featurizing may include operating on the input example 110 using the neural network 206A, processing circuitry 212A, and/or processing circuitry 212C as described and illustrated with regard to FIG. 2. The output example 120 is featurized (indicated by arrow 302B) to generate the complete output feature vector 222. Featurizing may include operating on the output example 120 using the neural network 206B, processing circuitry 212B, and/or processing circuitry 212D as described and illustrated with regard to FIG. 2.

The complete input feature vector 220 may include a forward input feature vector concatenated with a backward input feature vector. The complete output feature vector 222 may include a forward output feature vector concatenated with a backward output feature vector. In computing the cross-correlation, a discrete convolution of the complete input feature vector 220 and the complete output feature vector 222 may be performed. A convolution is an operation on an input example and a corresponding output example of an input-output example pair that produces an encoding that is a modified version of the input example and the output example. The convolution provides an element-wise dot product, for example, of the input example and the output example as a function of an amount that the input example and/or output example is translated.

The convolution includes padding (as indicated by arrow 304A) the complete input feature vector 220. Padding the complete input feature vector 220 may include adding a number of null characters (zeros in the example of FIG. 3) to the complete input feature vector 220 so that the complete input feature vector 220 and the complete output feature vector 222 include a same number of discrete values in a specific alignment. The padded input feature vector and padded output feature vector are aligned, at operation 306. A symbol-by-symbol operation 308 is performed for each symbol in the padded input feature vector and a corresponding aligned output feature vector. In one or more embodiments, the operation 308 may include a dot product, multiplication, division, addition, subtraction, concatenation, running an LSTM neural network over the values, or other operation. For each alignment, the values determined at operation 308 may be combined (as indicated by symbol ¤) and used as an element in the encoded vector 310. The symbol ¤ represents one or more of a concatenation, sum, average, running an LSTM neural network over the values, or other operation on the values determined at operation 308. For T characters (in our example, T=3), there are (2T−1) such possible alignments.

The outputs of the neural networks 206A-B and; or the processing circuitry 212A-D may be used as an input to the encoder system 300. For each input-output example pair (e.g., "Peter T Gates" and "Gates, P." are an input-output example pair, see FIG. 1), the complete output feature vector 222 is "slid" over the complete input feature vector 220 (or vice versa). A dot product or other value may be computed between the respective position representation. A result (sum, average, concatenation, a combination thereof, or the like) may be determined for each overlapping time step. The determined results for each time step may then be concatenated to form a 2T−1-dimensional vector encoding for each example pair. There are 2T−1 possible alignments in total between a complete input feature vector and a complete output feature vector.

A summed cross correlation encoder includes the symbol ¤ representing addition. A diffused cross correlation encoder includes the symbol representing a concatenation. In the diffused cross-correlation encoder, the encoded vector 310 includes dimensionality of (2T−1)·T (for at most T non-zero values in each of the (2T−1) alignments). For each input-output example pair. An augmented diffused cross correlation encoder may include combining the output of each character position of the diffused cross correlation encoder with the character embedding at this position. Then an LSTM neural network is run over the combined features to extract a 4*H-dimensional vector for both the input examples 110 and the output examples 120. The LSTM neural network output may be concatenated with the output of the diffused cross correlation encoder forming a (4*H+ T*(T−1))-dimensional feature vector for each input-output example pair.

An LSTM-sum cross-correlation encoder, instead of computing the element-wise dot product of the aligned input-output representations, runs a bidirectional (including forward and backward passes) LSTM neural network over the concatenated feature blocks of each alignment of input and output representations (e.g., for the first alignment, over the vector [A',B',C',0,0,0,0,D',E',F']). Each alignment may be represented by the 2H-dimensional bi-directional LSTM hidden representation of the final time step (from both directions). Such an encoder includes 2H·(2T−1) elements in the distributed representation for each input-output example.

Figure 4:
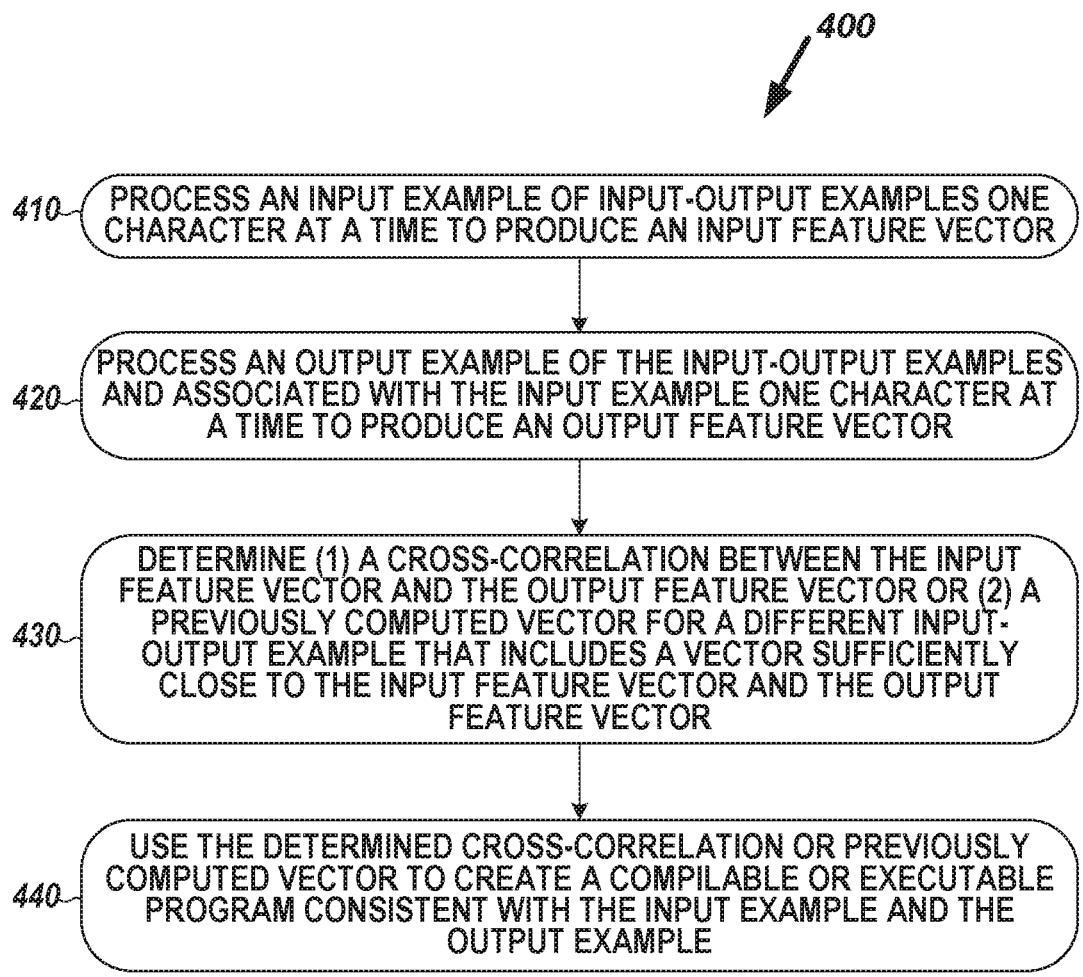
FIG. 4 illustrates, by way of example, a block diagram of an embodiment of a method for encoding input-output examples, such as the input examples and output examples of FIG. 1.

FIG. 4 illustrates, by way of example, a block diagram of an embodiment of a method 400 for encoding input-output examples, such as the input examples 110 and output examples 120. The method 400 as illustrated includes: processing an input example of input-output examples one character at a time to produce an input feature vector, at operation 410; processing an output example of the input-output examples associated with the input example one character at a time to produce an output feature vector, at operation 420; determining (1) a cross-correlation between the input feature vector and the output feature vector or (2) a previously computed vector for a different input-output example that includes a vector sufficiently close to the input feature vector and the output feature vector, at operation 430; and using the determined cross-correlation or previously computed vector to generate a compilable or executable program consistent with the input example and the output example, at operation 440. The operation 410 may include using a first LSTM neural network. The operation 420 may include using a second LSTM neural network.

The input example may include a plurality of characters including a first input character and a last input character. The output example may include a plurality of characters including a first output character and a last output character. The operation 410 may include traversing, using the first LSTM neural network, the input example from the first input character to the last input character. The operation 420 may include traversing, using the second LSTM neural network, the output example from the first output character to the last output character.

The input feature vector may include a concatenation or addition of an output from the first LSTM neural network over each character of the input example. The output feature vector may include a concatenation or addition of an output from the second LSTM neural network over each character of the output example. The input feature vector may be a forward input feature vector and the output feature vector may be a forward output feature vector. The method 400 may further include processing the input example, using the first LSTM neural network, one character at a time, from the last input character to the first input character to produce a backward input feature vector. The method 400 may further include processing the output example, using the second LSTM neural network, one character at a time, from the last output character to the first output character to produce a backward output feature vector.

The operation 430 may include determining a cross-correlation between (1) a concatenated input vector including a concatenation of the forward input vector and the backward input vector and (2) a concatenated output vector including a concatenation of the forward output vector and the backward output vector. The operation 430 may include convoluting the concatenated input vector and the concatenated output vector to produce a vector of elements. The method 400 may further include performing an operation including one or more of a sum, average, and concatenation of values of each element of the elements of the vector.

The method 400 may further include forming the first and second LSTM neural networks by training, using programs limited to a domain specific language (DSL) and a plurality of I/O examples consistent with each of the programs, the first and second LSTM neural networks. The DSL may comprise string, integer, real number, or other symbol transformations.

Figure 5A:
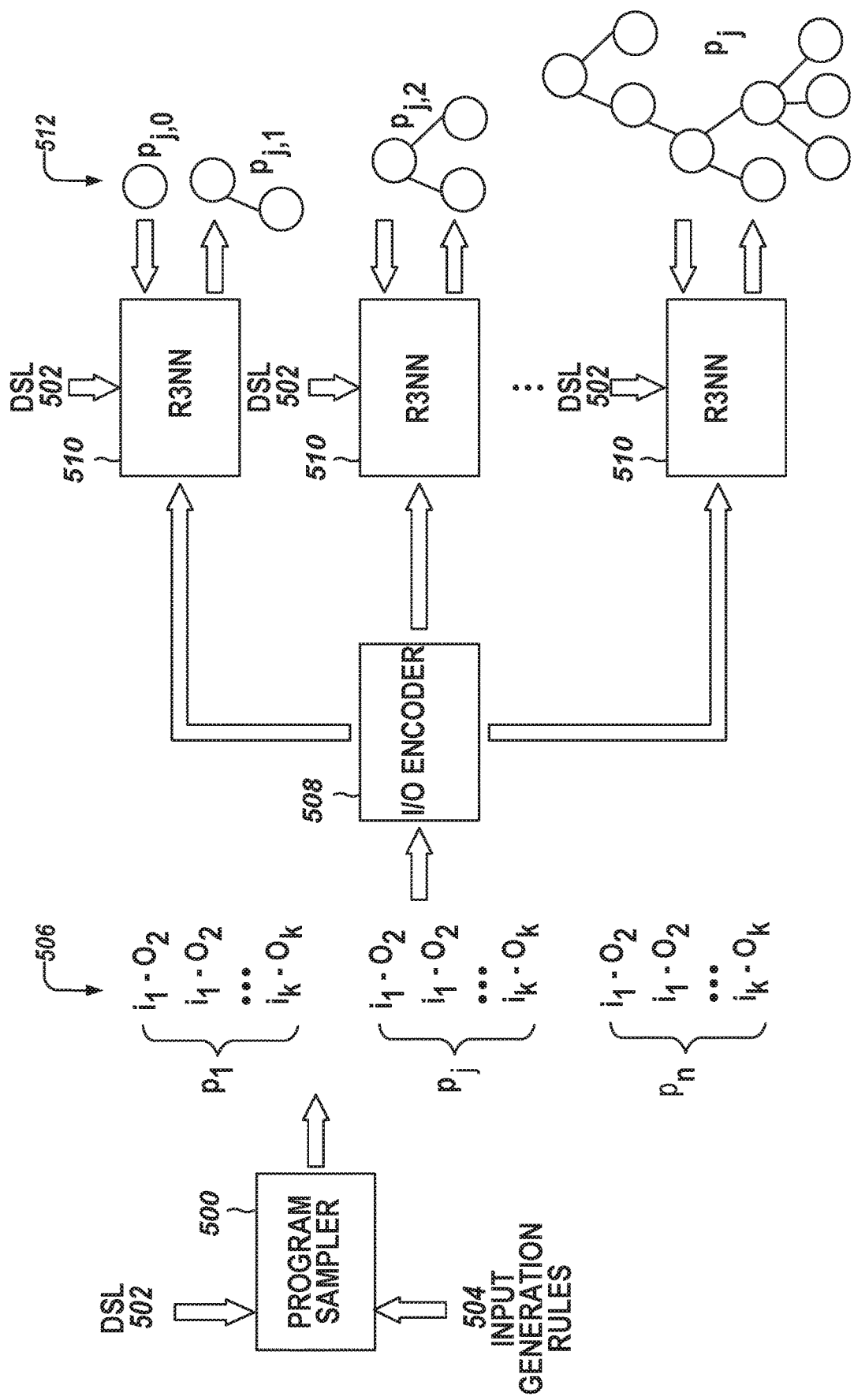
FIG. 5A illustrates, by way of example, a block diagram of an embodiment of a workflow for training neural networks for program synthesis.

FIG. 5A illustrates, by way of example, a block diagram of an embodiment of a workflow for training neural networks for program synthesis. To generate a large training set (e.g., including many programs with ten to twenty input-output examples each), a program sampler 500 may uniformly sample programs from the DSL 502 and generate well-formed inputs (e.g., input strings) that satisfy the preconditions of the programs based on suitable input generation rules 504. The corresponding outputs (e.g., output strings) are obtained by running the programs on the inputs. The resulting input-output examples 506 are passed through the input-output encoder 508, which generates distributed representations therefrom. These distributed representations of the input-output examples, along with the symbols and production rules of the DSL 502, are passed to the program-generation model 510 (e.g., in accordance with various embodiments, an R3NN model as described in detail below), which encodes and iteratively expands partial program trees 512 to incrementally build complete program trees. A measure of the difference between a program generated by the program-generation model 510 based on the input-output examples and the corresponding program sampled by the program sampler 500 is used as feedback to adjust parameters of the neural networks used in the input-output encoder 508 and the program-generation model 510. Suitable difference measures and techniques for training neural networks are well-known to those of ordinary skill in the art. Network weights for the program-generation model 510 and the input-output encoder 508 may be trained, for example, using the Adaptive Moment Estimation (Adam) variant of the stochastic gradient descent algorithm.

Figure 5B:
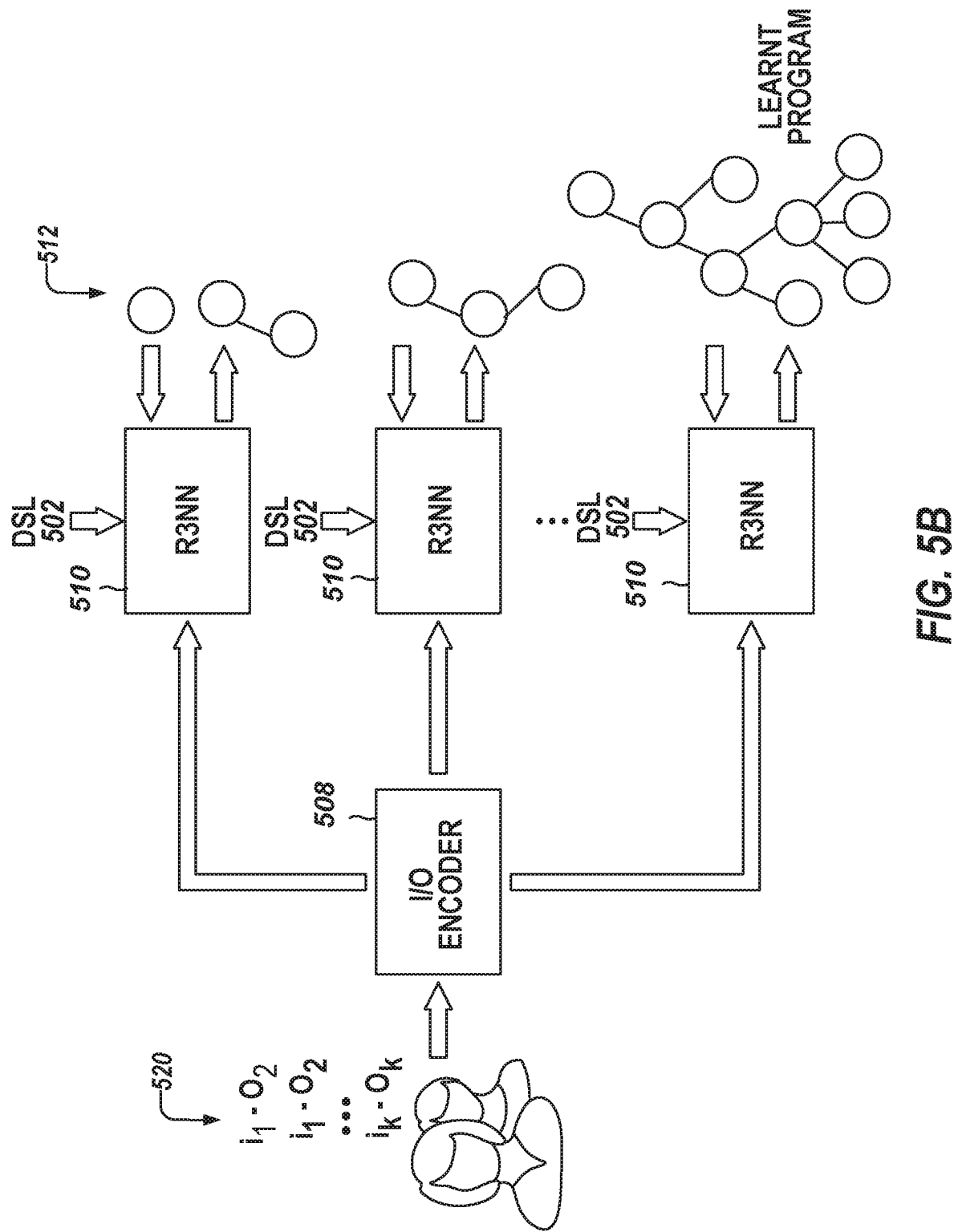
FIG. 5B illustrates, by way of example, a block diagram of an embodiment of a workflow for using trained neural networks to synthesize a program in a given DSL based on input-output examples.

FIG. 5B illustrates, by way of example, a block diagram of an embodiment of a workflow for using trained neural networks to synthesize a program in a given DSL based on input-output examples. The workflow uses the input-output encoder 508 and program-generation model 510, once trained for a particular DSL 502, to synthesize programs in that DSL based on input-output examples. A set of input-output examples 520 specifying the task to be performed by the program is fed into the input-output encoder 508 to generate a distributed representation therefrom. The encoded input-output examples are provided as input to the program-generation model 510, which, in the same manner as in the training phase described with reference to FIG. 5A, but now with fixed values of the neural-network parameters, iteratively expands a partial program tree 512, beginning with the root node, until all leaf nodes of the tree are terminals.

Recursive-Reverse-Recursive Neural Network (R3NN)

In various embodiments, the program-generation model 510 uses an R3NN to provide an efficient way of assigning probabilities to every valid expansion in the current partial program. Herein, a valid expansion is specified by two components: the production rule used, and the position of the non-terminal leaf node to which the production rule is applied relative to every other node in the tree. To account for the first component, a separate distributed representation for each production rule is maintained. The second component is handled using an architecture in which each node of the partial tree encodes global information about every other node in the tree. In brief, the R3NN assigns an initial distributed representation to each leaf node, and then performs a recursive pass through the tree from the leaves to the root node, followed by a reverse-recursive pass from the root back to the leaf nodes, resulting in a "global leaf representation" for each leaf node. The probability of a given expansion is calculated from the global leaf representation of the respective non-terminal leaf node and the distributed representation of the respective production rule, e.g., as a quantity proportional to the inner product between the production rule representation and the global leaf representation of the non-terminal node.

In more detail, the R3NN includes the following parameters for the grammar described by a DSL (which can be any functional DSL. i.e., any DSL without control flow (via loops and conditionals, etc.) and without stateful variables):

1. For every symbol s∈S, an M-dimensional representation $\theta(s) \in \mathbb{R}^M$.

2. For every production rule r∈R, an M-dimensional representation $\omega(r) \in \mathbb{R}^M$.

3. For every production rule r∈R, a deep neural network $f_r$ which takes as input a vector $x \in \mathbb{R}^{Q \cdot M}$, with Q being the number of symbols on the right hand side of the production rule r, and outputs a vector $y \in \mathbb{R}^M$. The input to the production-rule network $f_r$ is a concatenation of the distributed representations of each of its right-hand-side (RHS) symbols, and the output is a distributed representation for the left-hand-side (LHS) symbol.

4. For every production rule r∈R, an additional deep neural network $g_r$ which takes as input a vector $x \in \mathbb{R}^M$ and outputs a vector $y \in \mathbb{R}^{Q \cdot M}$. The deep neural network $g_r$ can be thought of as a reverse production-rule network that takes as input a distributed representation of the LHS symbols and produces a concatenation of the distributed representations of RHS symbols of the production rule.

Figure 6A:
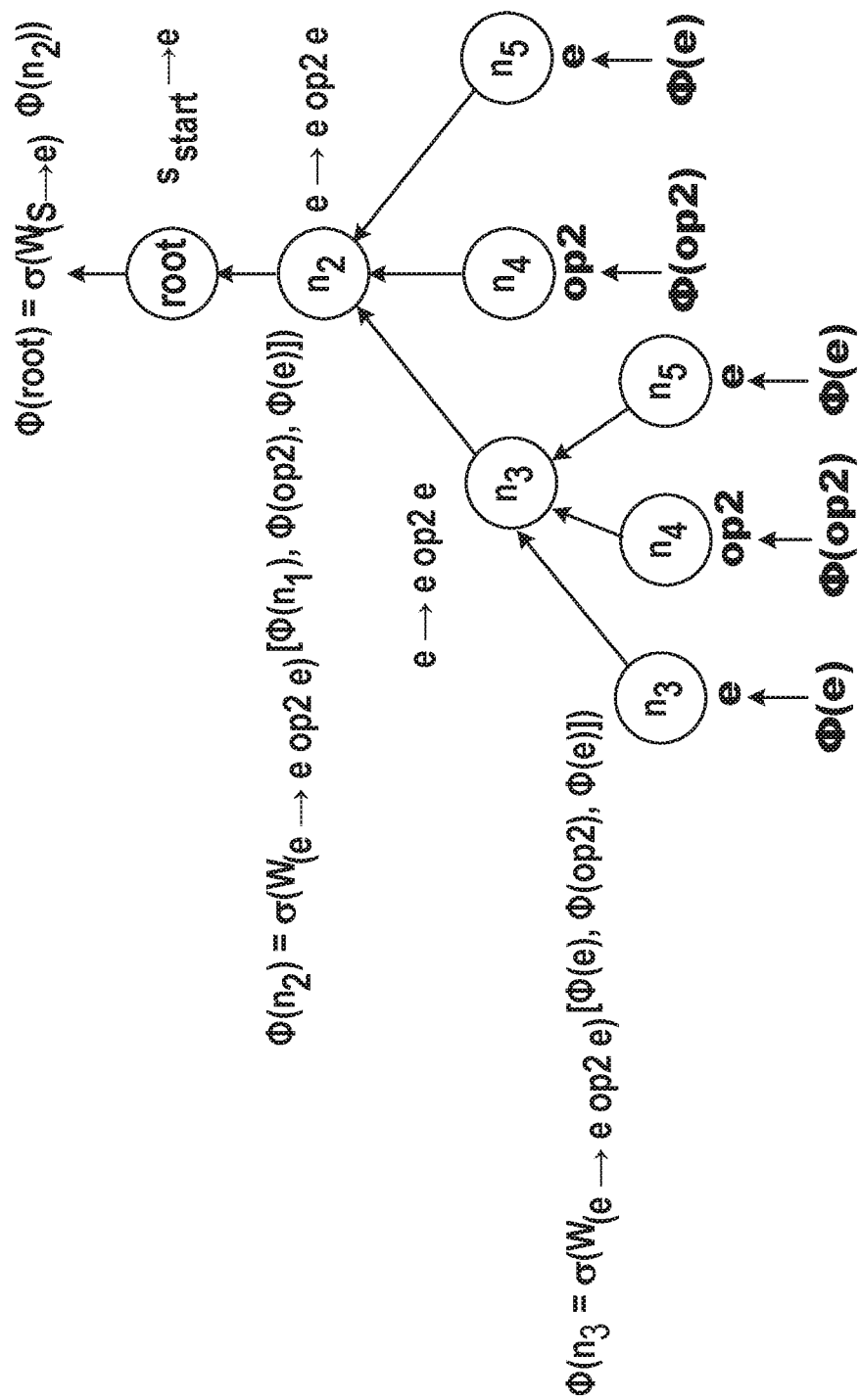
FIG. 6A illustrates, by way of example, a block diagram of an embodiment of a recursive pass through an example partial program tree, as may be used in a determination of expansion probabilities.
Figure 6B:
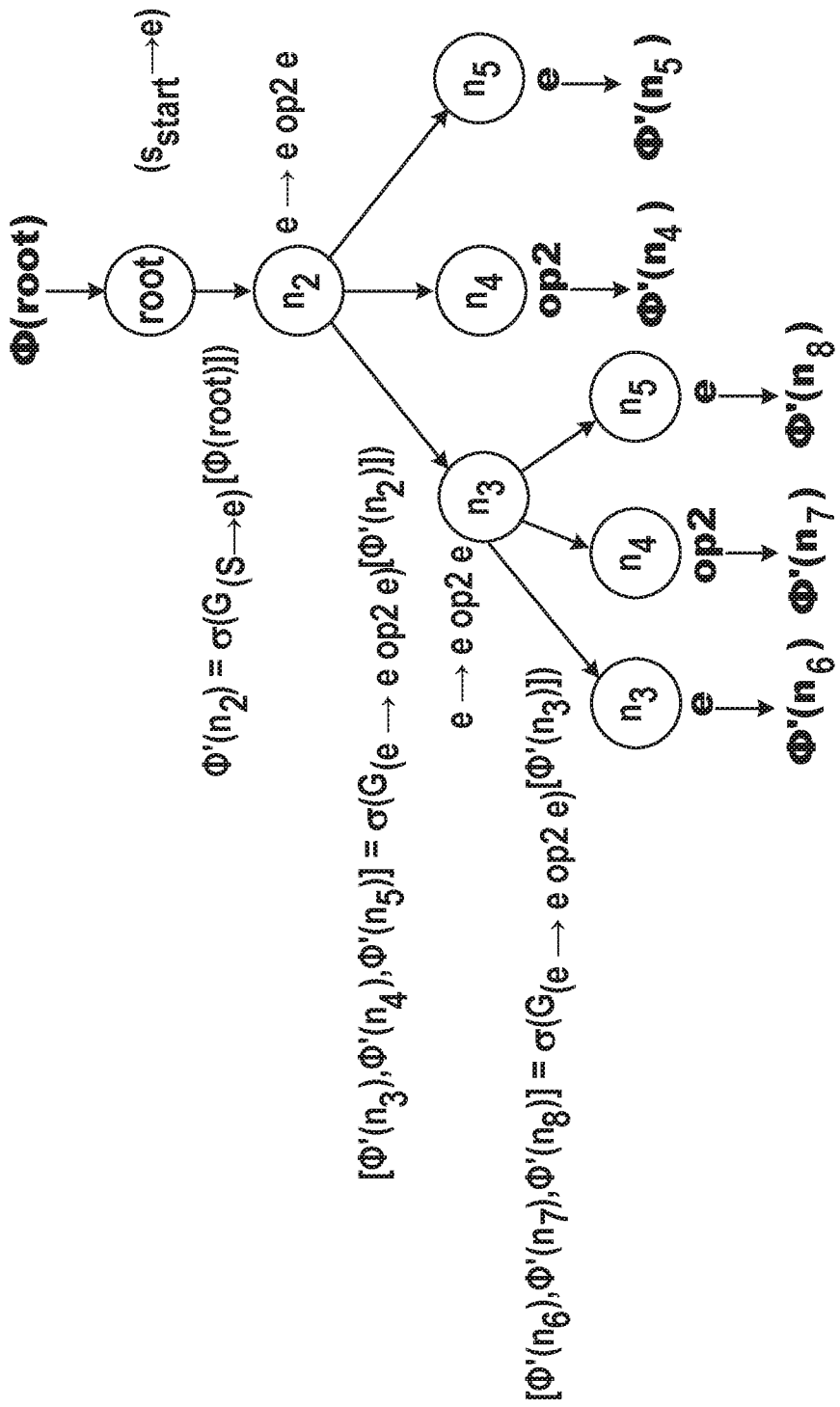
FIG. 6B illustrates, by way of example, a block diagram of an embodiment of a reverse-recursive pass through the example partial program tree of FIG. 6A, as may be used in the computation of expansion probabilities.

FIGS. 6A and 6B illustrate, by way of example, a block diagram of an embodiment of a recursive pass and a reverse-recursive pass through an example partial program tree, as may be used in a determination of expansion probabilities. Let E be the set of all valid expansions in a partial program tree T, let L be the current leaf nodes of T and N the current non-leaf (i.e., rule) nodes of T; and let s(l) be the symbol of leaf l∈L and r(n) represent the production rule of non-leaf node n∈N. To compute the probability distribution over the set E, the R3NN first computes a distributed global leaf representation for each leaf node (that is, a representation for each leaf node that contains global tree information).

With reference to FIG. 6A, the R3NN initially assigns to each leaf node l∈L in the tree its distributed representation θ(s(l)). A recursive bottom-to-top (RHS-to-LHS) pass through the tree is then performed by going up the tree and applying $f_r$ (n) to every non-leaf node n∈N on its right-hand node representations. At each step, the networks $f_r$ (n) produce a node representation that is input into the parent's rule network. The process is repeated iteratively until the root node is reached. At that point, the root node has an associated fixed-dimensionality global tree representation φ(root). This representation, however, has lost any notion of tree position. To solve this problem, the R3NN now performs what is effectively a reverse-recursive pass that starts at the root node with φ(root) as input and moves towards the leaf nodes.

With reference to FIG. 6B, more concretely, the root node representation φ(root) resulting from the recursive pass is supplied as input into the rule network $g_r$(root) for the production rule r(root) that is applied to the start symbol in T. This produces a representation φ_(c) for each RHS node c of r(root). If c is a non-leaf node, the procedure is repeated for node c. i.e., φ_(c) is input into $g_r$(c) to get representations φ_(cc) for every RHS node cc of r(c), and so on. If c is a leaf node, the leaf representation φ_(c) now has an information path to φ(root) and thus to every other leaf node in the tree. Accordingly, once the reverse-recursive pass is complete, the resulting distributed representation φ_(l) for every leaf node l contains global tree information (and this therefore a global leaf representation). While the initial leaf representations φ(l₁) and φ(l₂) are equal for leaf nodes that have the same symbol type, the global leaf representations φ_(l₁) and φ_(l₂) are generally not equal even if they have the same symbol type because the respective leaves are at different positions in the tree.

Once the global leaf representations φ_(l) have been computed, it is straightforward to determine scores for all possible expansions e∈E. For any given expansion e, let e.r be the expansion type (i.e., the production rule r∈R that e applies) and let e.l be the leaf node l that e.r is applied to. The score of an expansion may then be calculated as a function of the global leaf representation φ_(e.l) and the distributed representation ω(e.r). For example, in some embodiments, the score is calculated as the product $Z_e = \phi_-(e.l) \cdot \omega(e.r)$. The probability distribution over the set of extensions may be a normalized exponential distribution over the scores, that is, the probably of a given expansion e may be the exponentiated score, normalized by the sum of exponentiated scores over all extensions:

$$\pi(e) = \frac{e^{z_e}}{\sum_{e' \in E} e^{z_{e'}}}.$$

In some embodiments, to reduce the minimum length that information has to propagate between nodes in the tree, the global leaf representations are processed with a bidirectional LSTM network (as is known in to those of ordinary skill in the art) right before calculating the scores, and the LSTM hidden states, rather than the leaves themselves, are used in the score calculation. The global leaf representations are ordered sequentially from left-most leaf node to right-mode leaf node, where each leaf node is treated as a time step for a bidirectional-LSTM to process. This processing provides a skip connection between leaf nodes, which potentially reduces the path length that information needs to travel between leaf nodes in the tree.

While the above-described example embodiments refer specifically to the encoding of input and output strings in the DSL of string transformations, LSTM neural networks and cross-correlation encoders employing the principles described above may also be used to encode other types of input-output examples for other DSLs. Further, various modifications of and alternatives to the input-output encoding embodiments described herein may occur to those of ordinary skill in the art. For instance, input-output encoders as described herein can be augmented with additional external memory and/or attention vectors to learn richer distributed representations.

Figure 7:
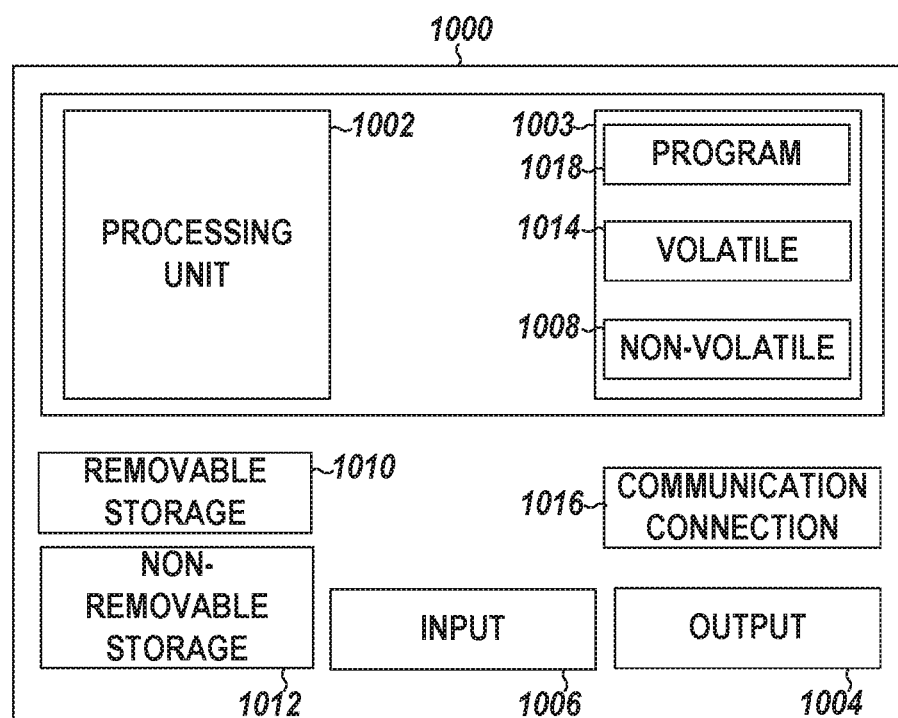
FIG. 7 illustrates, by way of example, a block diagram of an embodiment of a computer system, as may be used for performing methods.

FIG. 7 illustrates, by way of example, a block diagram of an embodiment of a machine 1000 (e.g., a computer system) to implement input-output example encoding and/or program synthesis. One example machine 1000 (in the form of a computer), may include a processing unit 1002, memory 1003, removable storage 1010, and non-removable storage 1012. Although the example computing device is illustrated and described as machine 1000, the computing device may be in different forms in different embodiments. For example, the computing device may instead be a smartphone, a tablet, smartwatch, or other computing device including the same or similar elements as illustrated and described with regard to FIG. 7. Devices such as smartphones, tablets, and smartwatches are generally collectively referred to as mobile devices. Further, although the various data storage elements are illustrated as part of the machine 1000, the storage may also or alternatively include cloud-based storage accessible via a network, such as the Internet.

Memory 1003 may include volatile memory 1014 and non-volatile memory 1008. The machine 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1000. A hard drive, CD-ROM, and RAM are some examples of articles including a non-transitory computer-readable medium such as a storage device. For example, a computer program 1018 may be used to cause processing unit 1002 to perform one or more methods or algorithms described herein.

Additional Notes and Examples

Example 1 includes a device comprising a processor, and a memory device coupled to the processor, the memory device including a program stored thereon for execution by the processor to perform operations, the operations comprising processing an input example of input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

In Example 2, Example 1 may further include, wherein the input example includes a plurality of characters including a first input character and a last input character, the output example includes a plurality of characters including a first output character and a last output character, the processing of the input example includes traversing, using the first LSTM neural network, the input example from the first input character to the last input character, and the processing of the output example includes traversing, using the second LSTM neural network, the output example from the first output character to the last output character.

In Example 3, Example 2 may further include, wherein the input feature vector includes a concatenation or addition of an output from the first LSTM neural network over each character of the input example and wherein the output feature vector includes a concatenation or addition of an output from the second LSTM neural network over each character of the output example.

In Example 4, Example 3 may further include, wherein determining (a) a cross-correlation between the input feature vector and the output feature vector or (b) a previously computed vector for a different input-output example that includes a vector sufficiently close to the input feature vector and the output feature vector includes determining the cross-correlation between the input feature vector and the output feature vector.

In Example 5, Example 4 may further include, wherein the input feature vector is a forward input feature vector and the output feature vector is a forward output feature vector, the operations further comprising processing the input example, using the first LSTM neural network, one character at a time, from the last input character to the first input character to produce a backward input feature vector, processing the output example, using the second LSTM neural network, one character at a time, from the last output character to the first output character to produce a backward output feature vector, wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector, wherein determining the cross-correlation includes convoluting the concatenated input vector and the concatenated output vector to produce a vector of elements, and performing an operation including one or more of a sum, average, and concatenation on values of each element of the elements of the vector.

Example 6 includes a method of generating a program using an encoding of input-output examples, the method comprising processing an input example of the input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

In Example 7, Example 6 may further include, wherein the input example includes a plurality of characters including a first input character and a last input character, the output example includes a plurality of characters including a first output character and a last output character, the processing of the input example includes traversing, using the first LSTM neural network, the input example from the first input character to the last input character, and the processing of the output example includes traversing, using the second LSTM neural network, the output example from the first output character to the last output character.

In Example 8, Example 7 may further include, wherein the input feature vector includes a concatenation or addition of an output from the first LSTM neural network over each character of the input example and wherein the output feature vector includes a concatenation or addition of an output from the second LSTM neural network over each character of the output example.

In Example 9, Example 8 may further include, wherein determining (a) a cross-correlation between the input feature vector and the output feature vector or (b) a previously computed vector for a different input-output example that includes a vector sufficiently close to the input feature vector and the output feature vector includes determining the cross-correlation between the input feature vector and the output feature vector.

In Example 10, Example 9 may further include, wherein the input feature vector is a forward input feature vector and the output feature vector is a forward output feature vector, the method further comprising processing the input example, using the first LSTM neural network, one character at a time, from the last input character to the first input character to produce a backward input feature vector, processing the output example, using the second LSTM neural network, one character at a time, from the last output character to the first output character to produce a backward output feature vector, and wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector.

In Example 11, Example 10 may further include, wherein determining the cross-correlation includes convoluting the concatenated input vector and the concatenated output vector to produce a vector of elements.

In Example 12, Example 11 may further include performing an operation including one or more of a sum, average, and concatenation of values of each element of the elements of the vector.

In Example 13, Example 12 may further include forming the first and second LSTM neural networks by training, using programs limited to a domain specific language (DSL) and a plurality of input-output examples consistent with each of the programs, the first and second LSTM neural networks.

In Example 14, Example 13 may further include, wherein generating the program consistent with the input example and output example includes using a recursive-reverse-recursive neural network (R3NN).

In Example 15, at least one of Examples 6-14 may further include, wherein determining (a) a cross-correlation between the input feature vector and the output feature vector or (b) a previously computed vector for a different input-output example that includes a vector sufficiently close to the input feature vector and the output feature vector includes determining the previously computed vector for a different input-output example that includes a vector sufficiently close to the input feature vector and the output feature vector.

Example 16 includes a non-transitory machine-readable medium including instructions for execution by a processor of the machine to perform operations comprising processing an input example of input-output examples, using a first long short term memory (LSTM) neural network, one character at a time to produce an input feature vector, processing an output example associated with the input example in the input-output examples, using a second LSTM neural network, one character at a time to produce an output feature vector, determining (a) a cross-correlation between the input feature vector and the output feature vector or (b) a previously computed vector for a different input-output example that includes feature vectors less than a threshold distance from the input feature vector and the output feature vector, respectively, and using the determined cross-correlation or previously computed vector, generating a program consistent with the input example and output example.

In Example 17, Example 16 may further include, wherein the input example includes a plurality of characters including a first input character and a last input character, the output example includes a plurality of characters including a first output character and a last output character, the processing of the input example includes traversing, using the first LSTM neural network, the input example from the first input character to the last input character, and the processing of the output example includes traversing, using the second LSTM neural network, the output example from the first output character to the last output character.

In Example 18, Example 17 may further include, wherein the input feature vector includes a concatenation or addition of an output from the first LSTM neural network over each character of the input example and wherein the output feature vector includes a concatenation or addition of an output from the second LSTM neural network over each character of the output example.

In Example 19, Example 18 may further include, wherein determining (a) a cross-correlation between the input feature vector and the output feature vector or (b) a previously computed vector for a different input-output example that includes a vector sufficiently close to the input feature vector and the output feature vector includes determining the cross-correlation between the input feature vector and the output feature vector.

In Example 20, Example 19 may further include, wherein the input feature vector is a forward input feature vector and the output feature vector is a forward output feature vector, the operations further comprising processing the input example, using the first LSTM neural network, one character at a time, from the last input character to the first input character to produce a backward input feature vector, processing the output example, using the second LSTM neural network, one character at a time, from the last output character to the first output character to produce a backward output feature vector, and wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
a processor; and
a memory device coupled to the processor, the memory device including a program stored thereon for execution by the processor to perform operations, the operations comprising:
processing an input example of input-output examples, using a first long short term memory (LSTM) neural network, one character at a time to produce an input feature vector;
processing an output example associated with the input example in the input-output examples, using a second LSTM neural network, one character at a time to produce an output feature vector;
determining (a) a cross-correlation between the input feature vector and the output feature vector or (b) a previously computed vector for a different input-output example that includes feature vectors less than a threshold distance from the input feature vector and the output feature vector, respectively; and
using the determined cross-correlation or previously computed vector, generating a program consistent with the input example and output example.

2. The device of claim 1, wherein:
the input example includes a plurality of characters including a first input character and a last input character;
the output example includes a plurality of characters including a first output character and a last output character;
the processing of the input example includes traversing, using the first LSTM neural network, the input example from the first input character to the last input character; and
the processing of the output example includes traversing, using the second LSTM neural network, the output example from the first output character to the last output character.

3. The device of claim 2, wherein the input feature vector includes a concatenation or addition of an output from the first LSTM neural network over each character of the input example and wherein the output feature vector includes a concatenation or addition of an output from the second LSTM neural network over each character of the output example.

4. The device of claim 3, wherein determining (a) a cross-correlation between the input feature vector and the output feature vector or (b) a previously computed vector for a different input-output example that includes a vector less than a threshold distance from the input feature vector and the output feature vector includes determining the cross-correlation between the input feature vector and the output feature vector.

5. The device of claim 4, wherein the input feature vector is a forward input feature vector and the output feature vector is a forward output feature vector, the operations further comprising:
processing the input example, using the first LSTM neural network, one character at a time, from the last input character to the first input character to produce a backward input feature vector;
processing the output example, using the second LSTM neural network, one character at a time, from the last output character to the first output character to produce a backward output feature vector;
wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector;
wherein determining the cross-correlation includes convoluting the concatenated input vector and the concatenated output vector to produce a vector of elements; and
performing an operation including one or more of a sum, average, and concatenation on values of each element of the elements of the vector.

6. A method of generating a program using an encoding of input-output examples, the method comprising:
processing an input example of the input-output examples, using a first long short term memory (LSTM) neural network, one character at a time to produce an input feature vector;
processing an output example associated with the input example in the input-output examples, using a second LSTM neural network, one character at a time to produce an output feature vector;
determining (a) a cross-correlation between the input feature vector and the output feature vector or (b) a previously computed vector for a different input-output example that includes feature vectors less than a threshold distance from the input feature vector and the output feature vector, respectively; and
using the determined cross-correlation or previously computed vector, generating a program consistent with the input example and output example.

7. The method of claim 6, wherein:
the input example includes a plurality of characters including a first input character and a last input character;
the output example includes a plurality of characters including a first output character and a last output character;
the processing of the input example includes traversing, using the first LSTM neural network, the input example from the first input character to the last input character; and
the processing of the output example includes traversing, using the second LSTM neural network, the output example from the first output character to the last output character.

8. The method of claim 7, wherein the input feature vector includes a concatenation or addition of an output from the first LSTM neural network over each character of the input example and wherein the output feature vector includes a concatenation or addition of an output from the second LSTM neural network over each character of the output example.

9. The method of claim 8, wherein determining (a) a cross-correlation between the input feature vector and the output feature vector or (b) a previously computed vector for a different input-output example that includes a vector less than a threshold distance from the input feature vector and the output feature vector includes determining the cross-correlation between the input feature vector and the output feature vector.

10. The method of claim 9, wherein the input feature vector is a forward input feature vector and the output feature vector is a forward output feature vector, the method further comprising:
processing the input example, using the first LSTM neural network, one character at a time, from the last input character to the first input character to produce a backward input feature vector;
processing the output example, using the second LSTM neural network, one character at a time, from the last output character to the first output character to produce a backward output feature vector; and
wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector.

11. The method of claim 10, wherein deter mining the cross-correlation includes convoluting the concatenated input vector and the concatenated output vector to produce a vector of elements.

12. The method of claim 11, further comprising performing an operation including one or more of a sum, average, and concatenation of values of each element of the elements of the vector.

13. The method of claim 6 further comprising:
forming the first and second LSTM neural networks by training, using programs limited to a domain specific language (DSL) and a plurality of input-output examples consistent with each of the programs, the first and second LSTM neural networks.

14. The method of claim 13, wherein generating the program consistent with the input example and output example includes using a recursive-reverse-recursive neural network (R3NN).

15. The method of claim 6, wherein determining (a) a cross-correlation between the input feature vector and the output feature vector or (b) a previously computed vector for a different input-output example that includes a vector less than a threshold distance from the input feature vector and the output feature vector includes determining the previously computed vector for a different input-output example that includes a vector less than the threshold distance from the input feature vector and the output feature vector.

16. A non-transitory machine-readable medium including instructions for execution by a processor of the machine to perform operations comprising:
processing an input example of input-output examples, using a first long short term memory (LSTM) neural network, one character at a time to produce an input feature vector;
processing an output example associated with the input example in the input-output examples, using a second LSTM neural network, one character at a time to produce an output feature vector;
determining (a) a cross-correlation between the input feature vector and the output feature vector or (b) a previously computed vector for a different input-output example that includes feature vectors less than a threshold distance from the input feature vector and the output feature vector, respectively; and
using the determined cross-correlation or previously computed vector, generating a program consistent with the input example and output example.

17. The non-transitory machine-readable medium of claim 16, wherein:
the input example includes a plurality of characters including a first input character and a last input character;
the output example includes a plurality of characters including a first output character and a last output character;
the processing of the input example includes traversing, using the first LSTM neural network, the input example from the first input character to the last input character; and
the processing of the output example includes traversing, using the second LSTM neural network, the output example from the first output character to the last output character.

18. The non-transitory machine-readable medium of claim 17, wherein the input feature vector includes a concatenation or addition of an output from the first LSTM neural network over each character of the input example and wherein the output feature vector includes a concatenation or addition of an output from the second LSTM neural network over each character of the output example.

19. The non-transitory machine-readable medium of claim 18, wherein determining (a) a cross-correlation between the input feature vector and the output feature vector or (b) a previously computed vector for a different input-output example that includes a vector less than a threshold distance from the input feature vector and the output feature vector includes determining the cross-correlation between the input feature vector and the output feature vector.

20. The non-transitory machine-readable medium of claim 19, wherein the input feature vector is a forward input feature vector and the output feature vector is a forward output feature vector, the operations further comprising:
processing the input example, using the first LSTM neural network, one character at a time, from the last input character to the first input character to produce a backward input feature vector;
processing the output example, using the second LSTM neural network, one character at a time, from the last output character to the first output character to produce a backward output feature vector; and
wherein determining a cross-correlation between the input feature vector and the output feature vector includes determining a cross-correlation between (a) a concatenated input vector including a concatenation of the forward input feature vector and the backward input feature vector and (b) a concatenated output vector including a concatenation of the forward output feature vector and the backward output feature vector.

* * * * *